(12) United States Patent
Rickman

(10) Patent No.: US 8,620,034 B2
(45) Date of Patent: Dec. 31, 2013

(54) SYSTEM AND METHOD FOR BIOMETRIC IDENTIFICATION USING ULTRAVIOLET (UV) IMAGE DATA

(75) Inventor: Dale M. Rickman, Kensington, MD (US)

(73) Assignee: Raytheon Company, Waltham, MA (US)

(*) Notice: Subject to any disclaimer, the term of this patent is extended or adjusted under 35 U.S.C. 154(b) by 357 days.

(21) Appl. No.: 13/076,725

(22) Filed: Mar. 31, 2011

(65) Prior Publication Data

US 2012/0250948 A1     Oct. 4, 2012

(51) Int. Cl.
*G06K 9/00*      (2006.01)

(52) U.S. Cl.
USPC ............................................. 382/115

(58) Field of Classification Search
None
See application file for complete search history.

(56) References Cited

PUBLICATIONS

Philip E. Miller, Allen W. Rawls, Shrinivas J. Pundlik, and Damon L. Woodard. 2010. Personal identification using periocular skin texture. In Proceedings of the 2010 ACM Symposium on Applied Computing (SAC '10).*
John Daugman, "How Iris Recognition Works", IEEE Transactions on Circuits and Systems for Video Technology, 2004, pp. 1-10.

* cited by examiner

*Primary Examiner* — Claire X Wang
*Assistant Examiner* — Thomas A James
(74) *Attorney, Agent, or Firm* — Cantor Colburn LLP

(57) ABSTRACT

A system and method for biometric identification of a target individual based on a query containing UV image data of the target individual. In one embodiment, the system includes a first database, a query module, a detection module, a sequence module and a match module. The first database includes a plurality of identities with each identity having at least one binary sequence representative of a skin area of that identity. The query module receives the query and validates the UV image data. The detection module detects at least one skin area in the UV image data. The sequence module forms at least one target binary sequence corresponding to the at least one skin area. The match module searches the first database based on the at least one target binary sequence to identify at least one identity thereby facilitating biometric identification of the target individual.

20 Claims, 3 Drawing Sheets

SYSTEM AND METHOD FOR BIOMETRIC IDENTIFICATION USING ULTRAVIOLET (UV) IMAGE DATA

TECHNICAL FIELD OF THE DISCLOSURE

This disclosure relates generally to biometric identification. More particularly, this disclosure relates to a system and method for biometric identification of an individual using ultraviolet (UV) image data.

BACKGROUND OF THE DISCLOSURE

The ability to accurately identify people is becoming more and more important in today's world. The systems currently utilized today to detect and accurately identify individuals have proven to be very limited and inadequate for use in addressing many of today's needs in the area of access control. For one, the current systems utilize sensor technologies that are inadequate for detecting and accurately identifying target individuals from a distance. For example, there is a growing need to be able to accurately and quickly identify individuals traveling through points of entry and exit, such as at airports and border crossings where the sensing is necessarily performed from a distance.

Secondly, the types of information currently being sensed on target individuals by today's systems do not allow for detection at a distance. To achieve accurate and reliable identification, the systems typically involve the detection and measuring of one or more biometric parameters of the target individual. As such, the detection and measuring is generally accomplished through the use of sensors requiring either direct contact with or at least operation in very close proximity to the individual. In either case, the biometric measurement is typically performed with the individual's full knowledge and cooperation. For example, some typical sensors are finger print, eye or facial scanners which all require either direct contact or operation in very close proximity to the individual.

Furthermore, together with the limitations associated with distance, the systems currently in use today require controlled environmental conditions to operate successfully, such as with finger print, eye or facial scanners. Many of the applications arising in today's complex world are calling for systems that can detect and accurately identify individuals from distances of more than 50 meters away as well as in uncontrolled environmental conditions (such as when outside in cloudy, humid, windy, etc. types of conditions). Moreover, the type of information to be detected needs to be of the sort that facilitates accurate detection at such distances.

Accordingly, there exists a long felt need for an improved system and method for accurate biometric identification of target individuals from a distance that alleviates the inherent problems in the biometric identification systems currently being employed today for biometric identification; and which is better suited for use in applications calling for the detection and accurate identification of target individuals from distances of more than 50 meters away in uncontrolled environmental conditions.

SUMMARY OF THE DISCLOSURE

According to one embodiment of the present disclosure, a system for biometric identification of a target individual based on a query, the query including UV image data of the target individual, is presented that is comprised of a first database, a query module, a detection module, a sequence module and a match module. The first database includes a plurality of identities with each identity having at least one binary sequence representative of a skin area of that identity. The query module is operable to receive the query and validate the UV image data. The detection module is in communication with the query module and is operable to detect at least one skin area in the UV image data. The sequence module is in communication with the detection module and is operable to form at least one target binary sequence corresponding to the at least one skin area. The match module is in communication with the sequence module and is operable to search the first database based on the at least one target binary sequence to identify at least one identity and thereby facilitate the biometric identification of the target individual.

The system in one embodiment of the present disclosure may further comprise a second database comprised of a plurality of area tags with each having a polygonal shape assigned. The second database facilitates creating the at least one target binary sequence for the detected skin areas by way of providing the polygonal shapes for use in framing the skin areas to enable conversions to two-bit codes.

In one embodiment of the present disclosure, the match module may be operable to identify the identity by way of comparing the at least one target binary sequence to the binary sequences in the first database and calculating a Hamming Distance value for each comparison. The identity of the target individual will ultimately be determined by way of the identities associated with the binary sequences producing Hamming Distance values equal to or less than a threshold value.

Accordingly, some embodiments of the disclosure may provide numerous technical advantages. Some embodiments may benefit from some, none or all of these advantages. For example, a technical advantage of one embodiment of the disclosure may be an improved system and method for biometric identification of a target individual that is capable of operating from distances of greater than 50 meters away from the target individual. Furthermore, an improved system such as described herein can be operated at such distances that the target individual has no knowledge that they are being targeted for identification. Another embodiment may provide for a more efficient and accurate method for biometric identification of a target individual that takes advantage of certain characteristics of the individual's exposed skin areas by way of using ultraviolet (UV) image data to detect certain characteristics of exposed skin that are not otherwise visible under any other wavelength light source.

Another example of a potential technical advantage of one embodiment of the present disclosure is that it may alleviate the inherent problems in current systems with poor resolution when operating at distances beyond the close proximity of the target individual. Many current systems simply live with these limitations and are just used within their acceptable ranges of operation. The inherent characteristics of UV light having a very small wavelength may facilitate one embodiment of the present disclosure achieving much greater resolution than that of current systems.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description. The foregoing has outlined rather broadly some of the more pertinent and important advantages of the present disclosure in order that the detailed description of the disclosure that follows may be better understood so that the present contribution to the art can be more fully appreciated. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the present disclosure as set forth in the appended claims.

BRIEF DESCRIPTION OF THE DRAWINGS

For a fuller understanding of the nature and possible advantages of the present disclosure, reference should be had to the following detailed description taken in connection with the accompanying drawings in which.

Similar reference characters refer to similar parts throughout the several views of the drawings.

DETAILED DESCRIPTION OF THE EXAMPLE EMBODIMENTS

Figure 1:
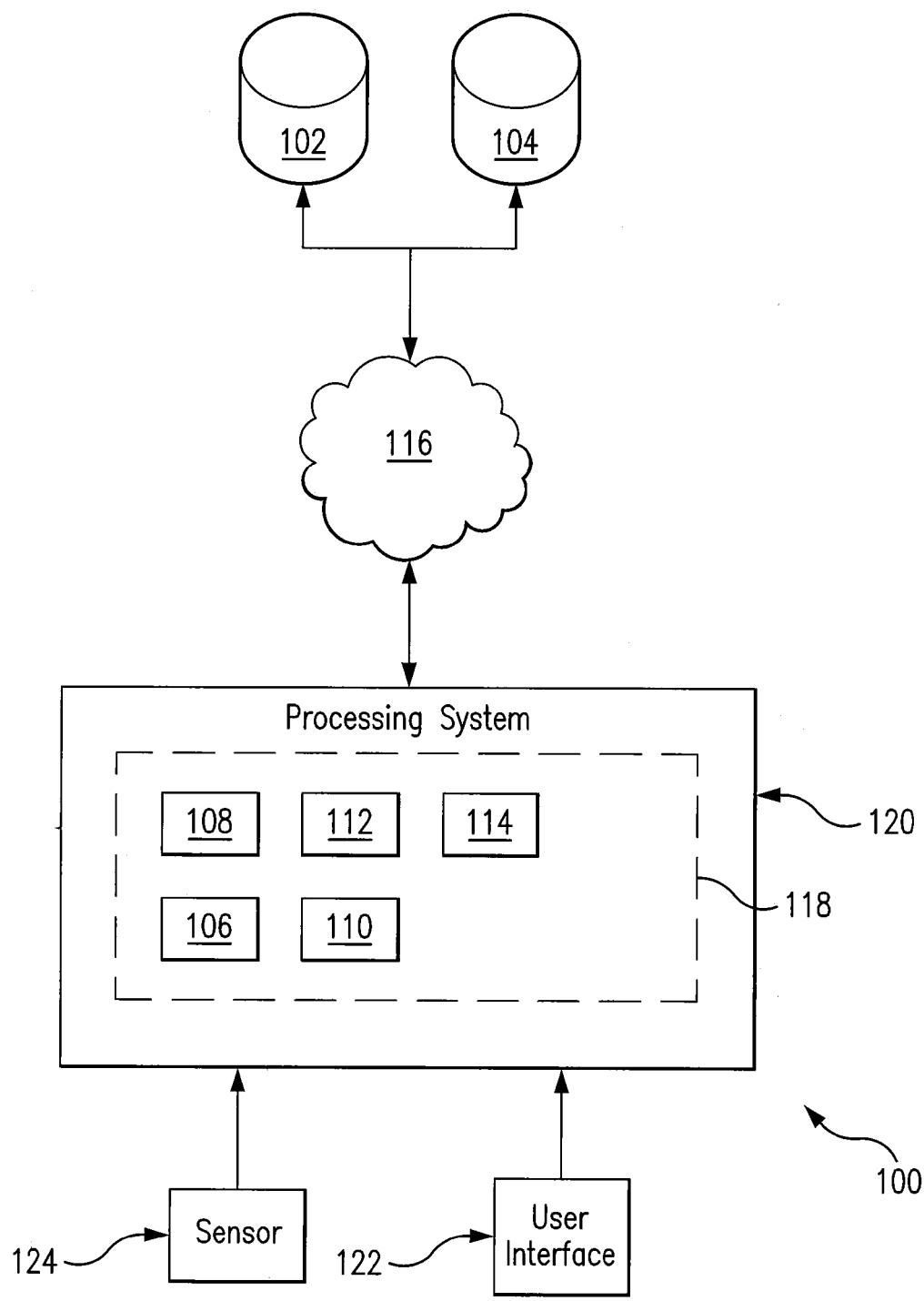
FIG. 1 is a block diagram illustrating the various components of one embodiment of a system for biometric identification of a target individual that includes UV image data of the target individual in accordance with the teachings of the present disclosure.

Referring to FIG. 1, a block diagram can be seen illustrating at a high level the various components of one exemplary embodiment of a system 100 providing for the biometric identification of a target individual based on a query having UV image data of the target individual in accordance with the teachings of the present disclosure. In the particular embodiment of FIG. 1, system 100 is comprised of a plurality of databases (namely, a first database 102 and a second database 104) in communication with and accessible by a plurality of modules (namely, a query module 106, a detection module 108, a sequence module 110, a match module 112, and an enrollment module 114) via a communication path 116.

In the particular embodiment of FIG. 1, the modules 106-114 are generally implemented in the form of one or more software modules residing in memory 118 associated with a processing system 120. The modules 106-114 can be written as a software program in any appropriate computer language, such as, for example, C, C++, C#, Java, Assembler, Tcl, Lisp, Javascript, or any other suitable language known in the software industry. The processing system 120 may be any suitable type of computing system implemented with a processor capable of executing computer program instructions stored in a memory, which can include a personal computer, a workstation, a network computer, or any other suitable processing device. The memory 118 may be implemented in the form of any memory for reading data from and writing data to and may include any one or combination of memory elements, such as random access memory (RAM), hard drive, tape, compact disc read/write (CD-RW), disk, diskette, cartridge, or the like resident in or associated with the processing system 120. However, in alternative embodiments, it should be understood that each of modules 106-114 may be separately implemented in the form of a software module residing in the memory associated with an individual standalone processing system with each operable to access the databases 102 and 104 via the communication path 116. The communication path 116 is preferably implemented in the form of a computer network.

The databases 102 and 104, in the particular embodiment of FIG. 1, are generally implemented in the form of individual database files residing in the memory associated with standalone processing systems. More particularly, the databases 102 and 104 may be implemented in the form of a plurality of individual processing systems, each having associated memory and a database file resident therein such as, for example, a plurality of individual database servers forming a distributed database system. Alternatively, in another embodiment, databases 102 and 104 may be implemented in the form of a plurality of database files residing in the memory associated with a single standalone processing system. Still further, in another embodiment, databases 102 and 104 may be implemented in the form of individual database files residing in the same memory associated with the one or more processing systems where modules 106-114 reside and wherein the communication path 116 may be implemented in the form of a bus configured within the one or more processing systems.

Database 102 in one embodiment of the present disclosure may be comprised of a plurality of identities with each having at least one binary sequence associated therewith that is representative of a skin area of that identity. It is preferable that each identity stored in the first database 102 is unique to itself in view of all other entries. In one embodiment, first database 102 may contain one or more identities that have more than one associated binary sequence, each binary sequence being representative of a different area of skin on the individual. The number of binary sequences associated with an identity may vary widely depending upon the specific aspects to be detected by system 100. Such as, for example, one application may be to identify individuals by way of detecting skin areas.

However, it should be understood by one skilled in the art that there are any number of alternative configurations that may be implemented for storing sets of identities having one or more associated binary sequences as may be suitable for a particular application of system 100. First database 102 is preferably configured to facilitate being accessed by match module 112 and enrollment module 114 for reading therefrom and writing thereto.

The second database 104, in one embodiment of the present disclosure, is preferably suitable to facilitate being accessed by sequence module 110 for searching for and retrieving a polygonal shape therefrom that is associated with an area tag corresponding to an area of skin on an individual. The second database 104, in one embodiment, may be comprised of a plurality of area tags each of which corresponds to a particular area on an individual. Each area tag has a polygonal shape associated with it and is configured to facilitate forming an outline of that particular area on the individual. This polygonal shape is used in the match module 112 as it performs its function. In one embodiment, match module 112 may include a threshold value maintained within and used in conjunction with the polygonal shapes to facilitate determining the identity as is further described in more detail below in connection with the calculation of the fractional Hamming Distance at step 220 in FIG. 2. Additionally, the query module 106 may include one or more photographic thresholds corresponding to one or more respective photographic parameters.

The processing system 120, in the embodiment, may further include a user interface 122 and one or more sensors 124 coupled thereto. User interface 122 may be implemented in the form of a display, such as a cathode ray tube (CRT) or liquid crystal display (LCD) screen, and any one or more input devices, such as a keyboard, touchpad, touch screen, a pointing device, a mouse or a joystick providing for interactive control of the processing system 120. Sensors 124 may be implemented in the form of any one or more suitable types of sensors configured to detect and/or measure features on a target individual through the use of Ultraviolet (UV) light to capture an image of the target individual at UV wavelengths. For example, a UV camera for capturing an image of the target individual by way of detecting UV light bouncing off of exposed skin areas on the target individual revealing details of the skin's texture.

Now that the individual components of system 100 have been described with regard to the particular embodiment of FIG. 1, the processes performed by and the interoperability of the modules 106-114 with the databases 102 and 104 will be addressed. To more fully understand and appreciate the detailed series of steps that may be performed by modules 106-114 during their operation to accomplish the teachings of the present disclosure, reference should now be made to FIG. 2.

Figure 2:
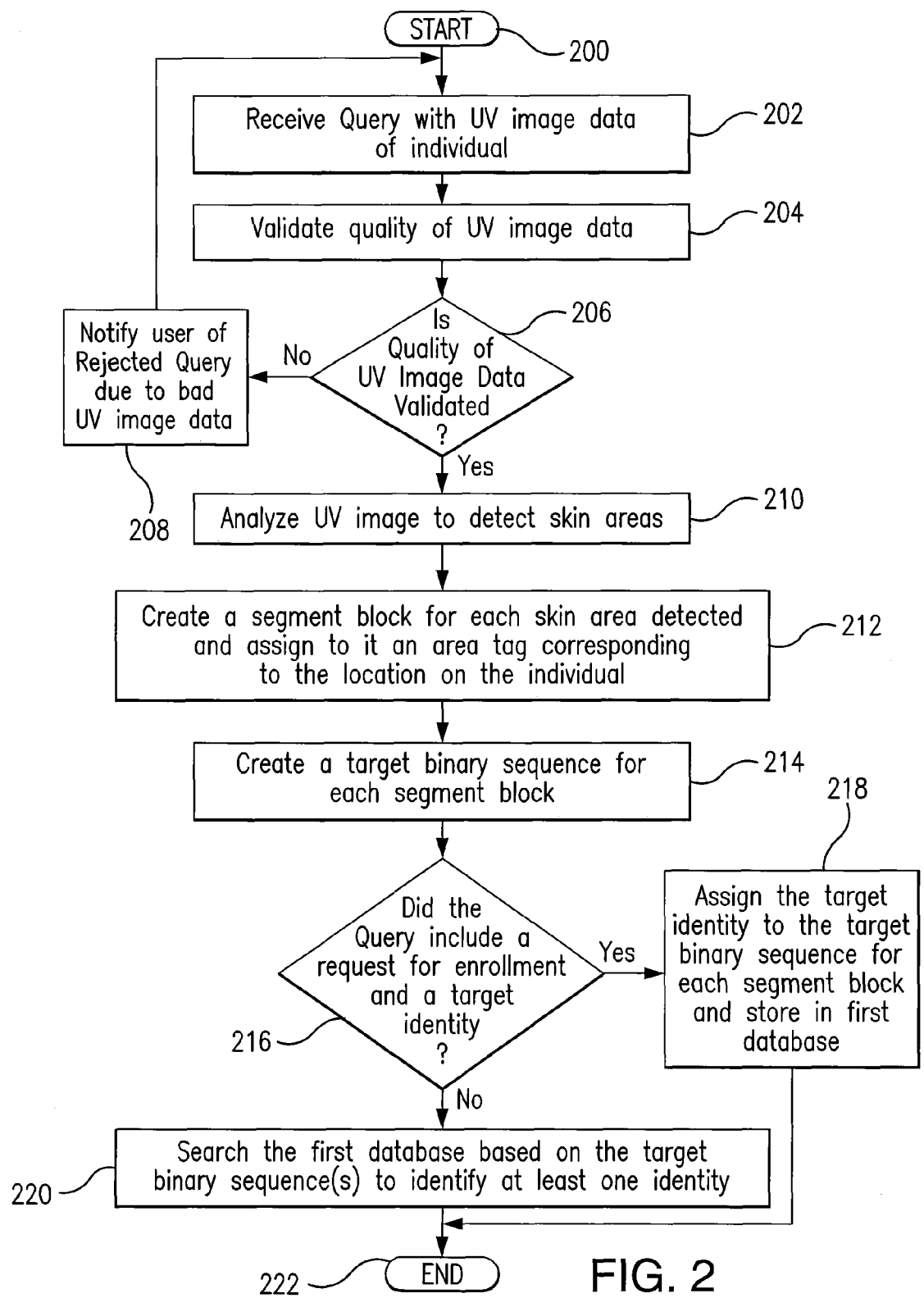
FIG. 2 is a flowchart showing one embodiment of a series of steps that may be performed by the system of FIG. 1 in accordance with the teaching's of the present disclosure.

In referring now to FIG. 2, a flow chart can be seen showing the details of one embodiment of a series of steps that may be performed by system 100 to carry out the biometric identification of a target individual in accordance with the teachings of the present disclosure. At step 200, the process is initiated. The process may be initiated by applying power to and performing any suitable bootstrapping operations to system 100. At step 202, the query module 106 receives the query and processes it to check for UV image data and any requests, such as, for example, a request for enrollment, a request for verification or a request for identification.

From step 202, the process proceeds to step 204. At step 204, the query module 106 assesses the UV image data to validate its quality. In one embodiment, the query module 106 may perform this validation by way of examining the UV image data with respect to certain photographic parameters and photographic thresholds therefor which were previously established within system 100 as being indicative of a particular quality level necessary for UV image data to be reliably used in system 100. For example, sharpness, number of pixels available or contrast may form one or more of the photographic parameters to be measured in the UV image data and compared against the previously established corresponding photographic thresholds (e.g., validate if equal to or greater than the required levels and not validate if less than). It should be understood by one skilled in the biometric arts that there are a number of varying parameters that may be used to assess the quality of an image being used for purposes of biometric identification, including one formed from UV image data, without deviating from the spirit of step 204. From step 204, the process then proceeds to step 206.

At step 206, the query module 106 then acts upon the outcome of the validation in step 204. In step 206, if it is determined that the UV image data is not validated, the process then proceeds to step 208 where the query module 106 rejects the query and UV image data and notifies the user that the UV image data was not sufficient. From step 208, the process then proceeds back to step 202 where it awaits receipt of another query having UV image data to process. If, however, it is determined at step 206 that the quality of the UV image data is validated, then the query module 106 transmits the query and the UV image data to the detection module 108 where the process continues at step 210.

At step 210, the detection module 108 receives the query and the UV image data and analyzes the UV image data to detect skin areas on the target individual. The detection of at least one skin area in the UV image data is necessary for potential successful identification of a target individual by system 100. The detection module 108 may accomplish the skin detection task by way of use of any one or more commercial-off-the-shelf (COTS) software products readily available in the industry. For example, the detection module 108 may utilize the software product for skin detection developed and offered by Carnegie Mellon Cylab. Such skin detection software may further preferably provide an outline (polygon) of each of the skin area(s) which then can be segmented out of the UV image data for further processing. However, it should be understood by one skilled in the art that other skin detection products may be equally utilized to accomplish the skin detection in step 210.

From step 210, the process proceeds to step 212. At step 212, the detection module creates a segment block for each skin area detected and assigns to each and area tag corresponding to its respective location on the target individual. In one particular embodiment, step 212 may be accomplished by way of use of any one or more COTS software products readily available in the industry. In one embodiment, it may be preferable that such segment blocks are created in a manner so to provide an outline (polygon) of the skin area which then can be segmented out of the UV image data for further processing. The area tag may be in one of many varying forms used to designate a particular location on the target individual where the respective skin area was detected. From step 212, the process then proceeds to step 214.

At step 214, the sequence module 110 receives the query and UV image data (now in the form of one or more segmented blocks each having an assigned area tag) from the detection module 108 and creates a target binary sequence for each segment block. In one embodiment of the present disclosure, the sequence module 110 may accomplish step 214 by way of further performing a series of steps in the form of first retrieving a polygonal shape from the second database 104 for each segment block based on the assigned area tag of that segment block (i.e., the polygon to be used for each skin area, e.g., a person's cheek, forehead, hand, etc.). For example, the forehead would be fit to a rectangle. Secondly, fitting each segment block (comprised of the segmented out UV image data) into the polygonal shape. Thirdly, dividing each polygonal shape (now containing the segmented out UV image data) into a plurality of squares. The plurality of squares may typically be fixed in number and based on the resolution deemed necessary for system 100 to accomplish its assigned application. Fourthly, converting each square into a binary code. And lastly, aggregating the binary codes to form the target binary sequence for the segment block.

Figure 3:
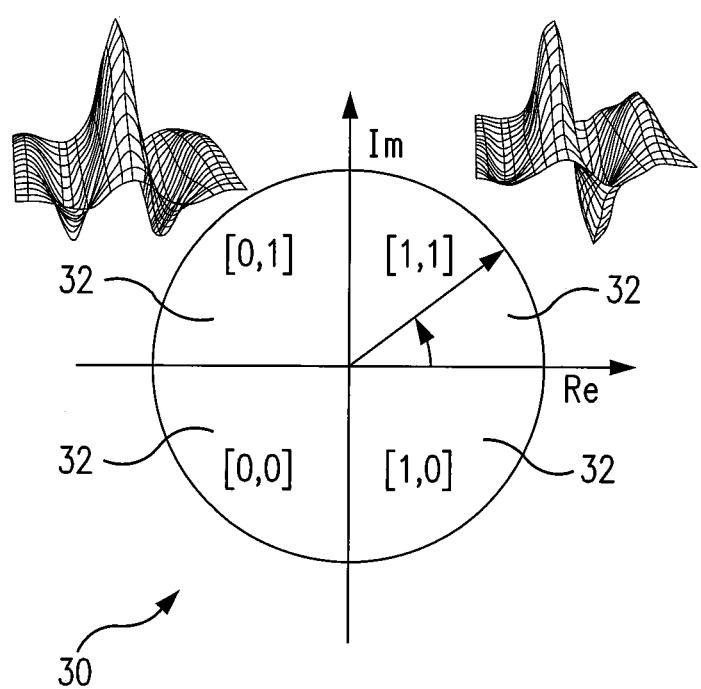
FIG. 3 is a graphical representation of a phase modulation process as utilized in one embodiment of the system of FIG. 1 for creating target binary sequences in accordance with the teachings of the present disclosure.

In one embodiment of the present disclosure, a phase modulation process may preferably be employed using Gabor wavelets to convert each square into 2-bit (binary) codes. That is, the segmented out UV image data now contained in the polygonal shape that was obtained from the segment block and then divided, the squares, are projected onto quadrature 2D Gabor wavelets, generating complex-valued coefficients whose real and imaginary parts specify the coordinates of a phasor in the complex plane 30 (See FIG. 3 for more clarity). The angle of each phasor is quantized to one of the four quadrants 32, setting two bits of phase information. This process is repeated across all the squares with many wavelet sizes, frequencies, and orientations, to extract 2,048 bits. However, it should be understood by one skilled in the art that the exact number of bits to obtain may vary widely and depend, in large part, on the particular application for which system 100 is being tasked with.

From step 214, the process then proceeds to step 216. At step 216, the sequence module 110 determines whether the query included a request for enrollment and a target identity. If yes, the sequence module 110 sends the target identity and the target binary sequence(s) to the enrollment module 114 and the process proceeds to step 218. At step 218, the enrollment module 114 assigns the target identity to the target binary sequence for each segment block and stores such in the first database 102. From step 218, the process then proceeds to step 222 where the process ends. However, if the query did not include a request for enrollment and a target identity, then the sequence module 110 sends the target binary sequence(s) to the match module 112 and the process proceeds to step 220.

At step 220, the match module 112 searches the first database based on the target binary sequence(s) to identify at least one identity. In one embodiment, the match module 112 may accomplish step 220 by way of searching the first database 102 having the plurality of identities, each having at least one binary sequence representative of a skin area on that identity, and comparing the target binary sequence(s) to each of the binary sequences in database 102. Additionally, the match module 112 includes a threshold value and performs the comparisons to identify at least one identity in view of such threshold value. That is, the at least one identity is identified by way of calculating a Hamming Distance value for each comparison and determining which of the identities are associated with the binary sequence(s) producing Hamming Distance values equal to or less than the threshold value. The binary sequence producing the lowest Hamming Distance value would then produce the best determined identity of the target individual.

More particularly, the matches are determined by way of computing the Hamming Distance between the binary sequences in the first database 102 and the just created target binary sequence(s) resulting from the UV Image data of the target individual. Specifically, the applicable test of statistical independence in one embodiment of the present disclosure may be implemented mathematically by way of the simple Boolean Exclusive-OR operator (XOR) applied to the 2,048 bit phasors that encode any two binary sequences and target binary sequence(s), masked (AND'ed) by both of their corresponding mask bit vectors to prevent non-skin artifacts from influencing the comparisons (e.g., a watch worn on the arm). The XOR operator detects disagreement between any corresponding pair of bits, while the AND operator ensures that the compared bits are both deemed to have been uncorrupted by non-skin artifacts, or other noise.

The norms of the resultant bit vector and of the AND'ed mask vectors are then measured in order to compute a fractional Hamming Distance (HD) as the measure of the dissimilarity between any two binary sequences and target binary sequence(s), whose two phase code bit vectors are denoted (codeA, codeB) and whose mask bit vectors are denoted (maskA, maskB):

$$HD = \frac{\|(codeA \otimes codeB) \cap maskA \cap maskB\|}{\|maskA \cap maskB\|}$$

The denominator tallies the total number of phase bits that mattered in the comparisons after artifacts, such as eyebrows, were discounted, so the resulting HD is a fractional measure of dissimilarity (a value of zero (0) would represent a perfect match). From step 220, the process then proceeds to step 222 where the process for biometric identification of a target individual in accordance with the teachings of the present disclosure ends.

The present disclosure includes that contained in the appended claims, as well as that of the foregoing description. Although this disclosure has been described in its preferred form in terms of certain embodiments with a certain degree of particularity, alterations and permutations of these embodiments will be apparent to those skilled in the art. Accordingly, it is understood that the above descriptions of exemplary embodiments does not define or constrain this disclosure, and that the present disclosure of the preferred form has been made only by way of example and that numerous changes, substitutions, and alterations in the details of construction and the combination and arrangement of parts may be resorted to without departing from the spirit and scope of the invention.

What is claimed is:

1. A system for biometric identification of a target individual based on a query, the query including UV image data of the target individual, the system comprising:
    a first database having a plurality of identities, each identity having at least one binary sequence representative of a skin area of that identity;
    a query module that receives the query and validates the UV image data;
    a detection module in communication with said query module that detects at least one skin area in the UV image data;
    a sequence module in communication with said detection module that forms at least one target binary sequence corresponding to said at least one skin area; and
    a match module in communication with said sequence module that searches said first database based on said at least one target binary sequence to identify at least one said identity thereby facilitating biometric identification of the target individual.

2. The system of claim 1, wherein said match module searches said first database based on said at least one target binary sequence to identify at least one said identity by way of comparing said at least one target binary sequence to said binary sequences.

3. The system of claim 2, wherein said match module further includes a threshold value, and wherein the at least one said identity is identified by way of calculating a Hamming Distance value for each comparison and determining which said identities are associated with said binary sequences producing said Hamming Distance values equal to or less than said threshold value.

4. The system of claim 1, further including a second database comprising a plurality of area tags each having a polygonal shape assigned.

5. The system of claim 4, wherein said detection module is further operable to create a segment block for each of said at least one skin area, each said segment block having one said area tag assigned corresponding to the location of said skin area on the individual.

6. The system of claim 5, wherein said sequence module forms at least one target binary sequence by way of retrieving a polygonal shape from said second database for each said segment block based on the assigned said area tag, fitting each said segment block into said polygonal shape, dividing each said polygonal shape into a plurality of squares, converting each square into a binary code, and aggregating said binary codes to form said target binary sequence for said segment block.

7. The system of claim 1, further comprising an enrollment module in communication with said sequence module, said enrollment module being operable, when the query includes a request for enrollment and a target identity, to assign said target identity to said at least one target binary sequence and store such in said first database.

8. A method for biometric identification of a target individual based on a query, the query including UV image data of the target individual, the method comprising the steps of:
validating the UV image data in the query;
analyzing the UV image data to detect at least one skin area;
creating at least one target binary sequence corresponding to said at least one skin area;
searching, based on said at least one target binary sequence, a first database containing a plurality of identities, each identity having at least one binary sequence representative of a skin area on that identity, to identify at least one said identity thereby facilitating biometric identification of the individual.

9. The method of claim 8, wherein the step of searching said first database based on said at least one target binary sequence to identify at least one said identity comprises comparing said at least one target binary sequence to said binary sequences.

10. The method of claim 9, wherein the step of searching a first database initially comprises the step of establishing a threshold value, and wherein the at least one said identity is identified by way of calculating a Hamming Distance value for each comparison and determining which said identities are associated with said binary sequences producing said Hamming Distance values equal to or less than said threshold value.

11. The method of claim 8, wherein the step of analyzing the LTV image data is comprised of creating a segment block for each of said at least one skin area, each said segment block having an area tag assigned corresponding to the location of said skin area on the individual.

12. The method of claim 11, wherein the step of creating at least one target binary sequence comprises the steps of:
retrieving, for each said segment block, a polygonal shape from a second database based on the assigned said area tag of said segment block;
fitting each said segment block into said polygonal shape;
dividing each said polygonal shape into a plurality of squares;
converting each square into a binary code; and aggregating said binary codes to form said target binary sequence for said segment block.

13. The method of claim 8, further comprising the step of, when the query includes a request for enrollment and a target identity, assigning said target identity to said at least one target binary sequence and storing such in said first database.

14. The method of claim 8, wherein the step of validating the UV image data comprises the steps of:
measuring at least one photographic parameter of the UV image data; and
confirming that said at least one photographic parameter exceeds a corresponding photographic threshold.

15. A non-transitory, computer readable storage medium having computer readable instructions stored thereon that, when executed by a computer, implement a method for biometric identification of a target individual based on a query, the query including UV image data of the target individual, the method comprising:
receiving a query containing UV image data of a target individual;
validating said UV image data;
analyzing said UV image data to detect at least one skin area;
creating at least one target binary sequence corresponding to said at least one skin area;
searching, based on said at least one target binary sequence, a first database containing a plurality of identities, each identity having at least one binary sequence representative of a skin area on that identity, to identify at least one said identity.

16. The computer readable storage medium of claim 15, wherein the method further comprises searching said first database based on said at least one target binary sequence by way of comparing said at least one target binary sequence to said binary sequences.

17. The computer readable storage medium of claim 16, wherein the method further comprises comparing said at least one target binary sequence to said binary sequences by way of calculating a Hamming Distance value for each comparison and determining which said identities are associated with such said binary sequences that produce said Hamming Distance values equal to or less than a threshold value.

18. The computer readable storage medium of claim 15, wherein the method further comprises creating a segment block for each of said at least one skin area that is detected, and assign each said segment block an area tag corresponding to the location of said skin area on the individual.

19. The computer readable storage medium of claim 18, wherein the method further comprises creating at least one target binary sequence by way of:
retrieving, for each said segment block, a polygonal shape from a second database based on the assigned said area tag of said segment block;
fitting each said segment block into said polygonal shape;
dividing each said polygonal shape into a plurality of squares;
converting each square into a binary code; and
aggregating said binary codes to form said target binary sequence for said segment block.

20. The computer readable storage medium of claim 15, wherein the method further comprises validating said LTV image data by way of:
measuring at least one photographic parameter of said UV image data; and
confirming that said at least one photographic parameter exceeds a corresponding photographic threshold.

* * * * *